US010816806B2

(12) United States Patent
Yamaguchi et al.

(10) Patent No.: US 10,816,806 B2
(45) Date of Patent: Oct. 27, 2020

(54) EYEPIECE OPTICAL SYSTEM AND IMAGE DISPLAY DEVICE

(71) Applicant: SEIKO EPSON CORPORATION, Tokyo (JP)

(72) Inventors: Tokito Yamaguchi, Azumino (JP); Masayuki Takagi, Azumino (JP); Toshiaki Miyao, Matsumoto (JP); Akira Komatsu, Tatsuno-machi (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 14 days.

(21) Appl. No.: 16/162,698

(22) Filed: Oct. 17, 2018

(65) Prior Publication Data
US 2019/0113754 A1 Apr. 18, 2019

(30) Foreign Application Priority Data

Oct. 18, 2017 (JP) ................................. 2017-201614

(51) Int. Cl.
G02B 27/01 (2006.01)

(52) U.S. Cl.
CPC .. *G02B 27/0172* (2013.01); *G02B 2027/0178* (2013.01)

(58) Field of Classification Search
CPC ........ G02B 27/0172; G02B 2027/0178; G02B 2027/0123; G02B 27/1066
See application file for complete search history.

(56) References Cited

U.S. PATENT DOCUMENTS

| 5,734,505 | A | 3/1998 | Togino et al. | |
| 10,393,941 | B2* | 8/2019 | Nichol | G02B 6/0018 |
| 2008/0212195 | A1* | 9/2008 | Yamamoto | G02B 27/0093 359/630 |
| 2008/0316606 | A1* | 12/2008 | Inoguchi | G02B 27/0172 359/630 |
| 2009/0115842 | A1* | 5/2009 | Saito | G02B 17/004 348/53 |
| 2009/0153960 | A1* | 6/2009 | Inoguchi | G02B 27/0172 359/482 |
| 2010/0245211 | A1* | 9/2010 | Iba | G02B 17/086 345/8 |
| 2010/0290124 | A1* | 11/2010 | Tohara | G02B 27/0172 359/630 |
| 2011/0213664 | A1* | 9/2011 | Osterhout | G02B 27/017 705/14.58 |
| 2013/0050832 | A1* | 2/2013 | Tohara | G02B 27/0172 359/629 |

(Continued)

FOREIGN PATENT DOCUMENTS

JP H7-333549 A 12/1995

Primary Examiner — Ibrahim A Khan
(74) Attorney, Agent, or Firm — Oliff PLC

(57) ABSTRACT

An eyepiece optical system is configured to emit image light that is emitted from a plurality of display elements and corresponds to a plurality of areas being divided, to a position corresponding to an eye of an observer, wherein a first optical member of a complex type disposed at a position closest to an emitting side corresponding to at least two areas of the plurality of areas has a first optical surface on the emitting side, and the first optical surface is expressed by one curvature.

9 Claims, 13 Drawing Sheets

(56) References Cited

U.S. PATENT DOCUMENTS

| | | | |
|---|---|---|---|
| 2013/0050835 A1* | 2/2013 | Inoguchi | G02B 13/06 |
| | | | 359/630 |
| 2013/0135722 A1* | 5/2013 | Yokoyama | G02B 27/0172 |
| | | | 359/465 |
| 2014/0063062 A1* | 3/2014 | Fateh | G06T 11/206 |
| | | | 345/633 |
| 2016/0026253 A1* | 1/2016 | Bradski | G02B 27/225 |
| | | | 345/8 |
| 2016/0103306 A1* | 4/2016 | Takahashi | G02B 17/0816 |
| | | | 345/8 |
| 2016/0154243 A1* | 6/2016 | Aiki | G02B 27/0176 |
| | | | 359/633 |
| 2018/0052501 A1* | 2/2018 | Jones, Jr. | G02B 7/008 |
| 2019/0293939 A1* | 9/2019 | Sluka | G02B 27/0075 |

\* cited by examiner

EYEPIECE OPTICAL SYSTEM AND IMAGE DISPLAY DEVICE

BACKGROUND

1. Technical Field

The invention relates to an eyepiece optical system, which provides a video image to an observer, and an image display device in which the eyepiece optical system is incorporated.

2. Related Art

For example, in JP-A-7-333549, a head mounted display (hereinafter, also referred to as HMD) is disclosed, which is compact, lightweight, and low-priced while enabling a wide field angle. The head mounted display causes a plurality of display elements to display different images and causes a video image light from the plurality of display elements to enter eyes of an observer through a plurality of eyepiece optical systems. It is disclosed that, in the HMD, in order to allow a joint between the plurality of eyepiece optical systems to be visually unrecognizable, visual axial directions of the eyepiece optical systems are matched with each other, and exit pupils of the eyepiece optical systems are matched with each other, so that, at a joint part between a pair of the eyepiece optical systems, semi-transparent surfaces provided to both the eyepiece optical systems are continuous with each other.

However, in a periphery of the joint part between the plurality of eyepiece optical systems, a portion in which a curvature is significantly changed is formed in manufacturing. Accordingly, light passing through the joint part is diffused, and the diffused light enters the eyes of the observer. As a result, video image quality (particularly, contrast) is degraded, or the video image lacks a part due to adhesion of dirt in the periphery of the joint part.

SUMMARY

An advantage of the invention is to provide an eyepiece optical system and an image display device, which prevent degradation of video image quality and lack of a part of a video image due to light diffusion at a joint part at which image light beams corresponding to a plurality of areas are joined.

An eyepiece optical system according to the invention is an eyepiece optical system configured to emit image light that is emitted from a plurality of display elements and corresponds to a plurality of areas being divided, to a position corresponding to an eye of an observer, wherein a first optical member of a complex type disposed at a position closest to an emitting side corresponding to at least two areas of the plurality of areas has a first optical surface on the emitting side, and the first optical surface is expressed by one curvature.

In the above-mentioned eyepiece optical system, the first optical surface of the first optical member of a complex type on the emitting side, which is disposed at the position closest to the emitting side corresponding to the above-mentioned at least two areas, is a curved surface expressed by one curvature. Thus, even when the image light beams are superimposed with each other or caused to approach each other to join the image light beams on the emitting side of the first optical member, light diffusion and also lack of a part of a video image hardly occur at the joint between the image light beams.

In a specific aspect of the invention, the first optical surface is set to have a curvature corresponding to an eye relief. In this case, at the joint of the image light beams, the image light beams can be emitted to be gathered to a pupil from the first optical surface. Accordingly, image blur or disturbance can be reduced.

In another aspect of the invention, the eyepiece optical system includes a first optical system portion and a second optical system portion. The first optical system portion is disposed to cover a first area on a center side in which a visual axis extends frontward. The second optical system portion disposed in a second area is away from the visual axis, and is on an outer side of the first area covered by the first optical system portion. A joint part is provided between the first optical system portion and the second optical portion. In this case, the first optical portion mainly bears an image corresponding to the central visual field, and the second optical system portion mainly bears an image corresponding to the peripheral visual field.

In another aspect of the invention, the joint part is a part integrally coupling an emission lens part of the first optical portion and an emission lens part of the second optical system portion to each other. In this case, the emission lens part of the first optical portion and the emission lens part of the second optical system portion form an integrated lens component.

In another aspect of the invention, the first optical system portion on the center side has resolution higher than resolution of the second optical system portion on a peripheral side. In this case, an image with high resolution can be displayed on the central visual field side, and an image with relatively low resolution can be displayed on the peripheral visual field side. Thus, efficient display adjusted in view in consideration of visual characteristics is enabled.

In another aspect of the invention, the first optical system portion on the center side has a field angle smaller than a field angle of the second optical system portion on the peripheral side. In this case, designing of the first optical system portion bearing a heavy load in terms of resolution is relatively facilitated.

In another aspect of the invention, the joint part has a light absorbing part. In this case, a light passing through a recess or an edge remaining on the joint part can be reduced, and occurrence of light diffusion can be suppressed.

In another aspect of the invention, the light absorbing part is provided on a second optical surface opposite to the first optical surface of the joint part. In this case, a diffused light due to the recess tending to be formed on the second optical surface is prevented from being generated.

In another aspect of the invention, the light absorbing part has a width of 30 µm or less in a direction orthogonal to a boundary. With such width, a possibility of lack of a part of a video image can be lowered.

An image display device according to the invention includes the above-mentioned eyepiece optical system, a plurality of display elements configured to emit image light to the eyepiece optical system, and a controller configured to control display operations of the plurality of display elements.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Exemplary Embodiment

Now, with reference to the drawings, an eyepiece optical system and an image display device according to First Exemplary Embodiment of the invention are described.

Figure 1:
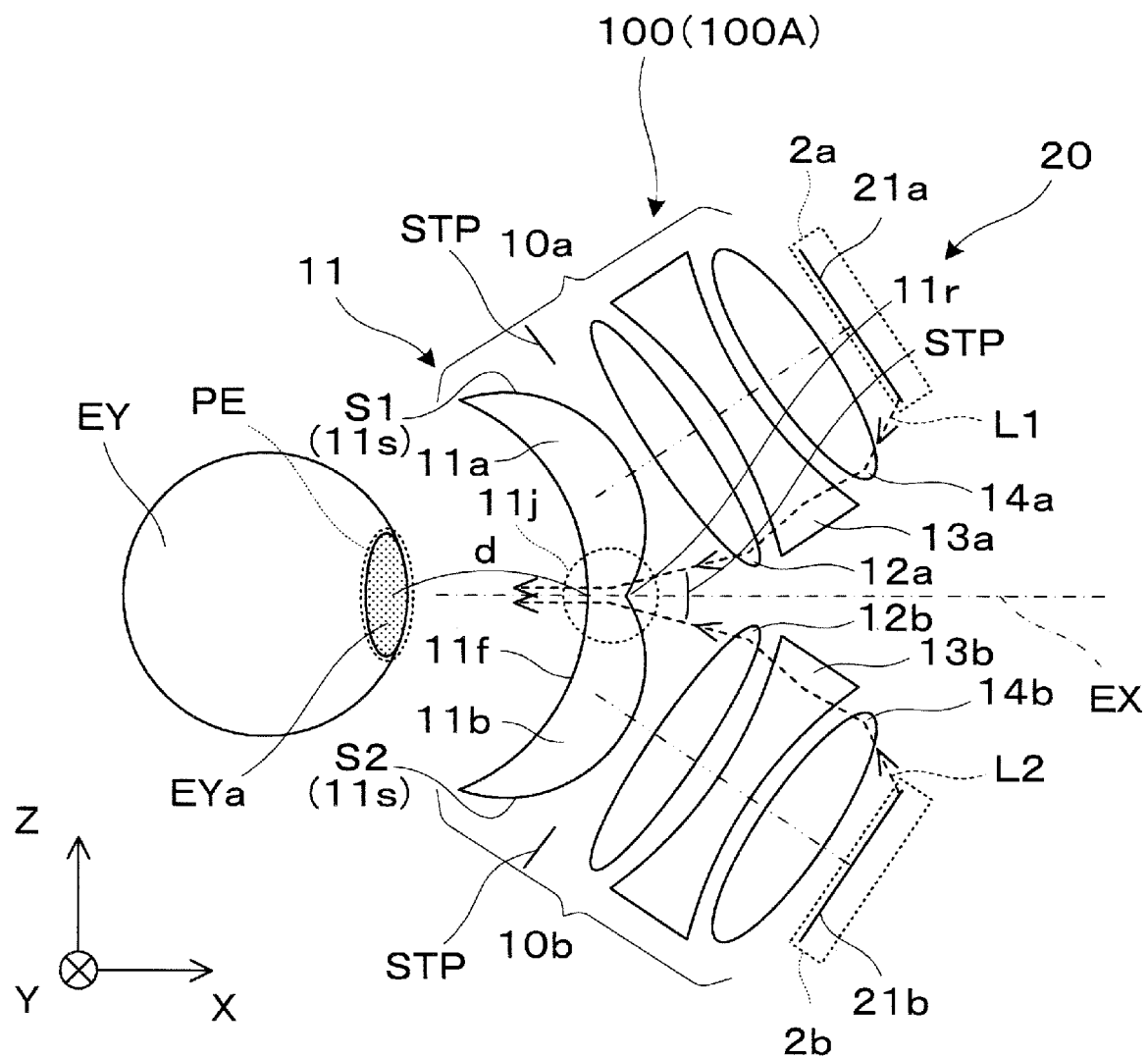
FIG. 1 is a side cross-sectional view for illustrating an eyepiece optical system according to First Exemplary Embodiment.

An eyepiece optical system 100 illustrated in FIG. 1 is an optical system for one eye to be incorporated in one image display unit of a pair of image display units forming an image display device of an eyeglasses type or a head mounted display. Note that, in FIG. 1 and the like, the symbols X, Y, and Z indicate three axes of an orthogonal coordinate system. The X axis corresponds to a front direction with respect to an eye EY and a direction extending in a visual axis EX. The Y axis corresponds to a lateral direction in which a pair of eyes of a standing observer are arrayed or a horizontal direction. The Z axis corresponds to a vertical direction perpendicular to the lateral direction in which the eyes are arrayed and the visual axis in a front view.

The eyepiece optical system 100 includes a first optical system portion 10a and a second optical system portion 10b. The first optical system portion 10a is disposed to cover a part above a center in which the visual axis EX of the front-faced eye EY extends. The second optical system portion 10b is disposed to cover a part below the center in which the visual axis EX of the front-faced eye EY extends. That is, the first optical system portion 10a mainly bears an image corresponding to an upper half of the vision that is divided into upper and lower sides. The second optical system portion 10b mainly bears an image corresponding to a lower half of the vision that is divided into the upper and lower sides.

The first optical system portion 10a includes a plurality of lenses. Specifically, in the order from an emitting side close to a position PE at which a pupil EYa of the eye EY is disposed, the first optical system portion 10a includes an emission lens part 11a, intermediate lenses 12a and 13a, and an incident lens 14a. Further, the second optical system portion 10b includes a plurality of lenses. Specifically, in the order from the emitting side close to the position PE corresponding to the pupil EYa, the second optical system portion 10b includes an emission lens part 11b, intermediate lenses 12b and 13b, and an incident lens 14b. The first optical system portion 10a and the second optical system portion 10b have a symmetrical shape and are disposed symmetrically across a horizontal surface or an XY surface in which the visual axis EX extends. However, the first optical system portion 10a and the second optical system portion 10b are not limited to this structure, and the first optical system portion 10a and the second optical system portion 10b may be different in terms of components. Note that, when the first optical system portion 10a and the second optical system portion 10b are configured to be symmetric with each other, the first optical system portion 10a and the second optical system portion 10b may adopt the same optical system. Thus, it is effective in cost reduction in manufacturing.

The emission lens part 11a of the first optical system portion 10a and the emission lens part 11b of the second optical system portion 10b form a first optical member 11 of a complex type including integrated lens components. A joint part 11j integrally coupling the emission lens part 11a and the emission lens part 11b is curved as a whole, and extends in the lateral Y direction. The first optical member 11 of a complex type is disposed correspondingly to two areas AR1 and AR2 (see FIG. 3C described later), which form a visual field, at a position closest to the emitting side to cover both the areas AR1 and AR2. A first optical surface 11f being a surface of the first optical member 11 on the emitting side is a common surface of the emission lens part 11a and the emission lens part 11b, and is one curved surface expressed by one curvature. The first optical surface 11f is a continuous curved surface, and is a spherical surface having a concave shape. A radius of curvature of the first optical surface 11f or a radius of curvature of a spherical surface approximate to the first optical surface 11f is a value equal or approximate to a distance d, in design, from the position PE of the pupil EYa to the first optical surface 11f. In other words, the first optical surface 11f is set to have a curvature corresponding to an eye relief. On the first optical surface 11f side, a state as if the joint part 11j were not present is obtained. Here, the distance d in design from the position PE of the pupil EYa to the first optical surface 11f is referred to as the eye relief, and is set to fall within a range from 5 mm to 20 mm. The radius of curvature of the first optical surface 11f is set approximate to the distance d from the position PE of the pupil EYa to the first optical surface 11f as described above. Accordingly, a joint between the emitting side of the first optical system portion 10a and the emitting side of the second optical system portion 10b can be visually unrecognizable. Image light L1 passing through the first optical system portion 10a and image light L2 passing through the second optical system portion 10b can easily be joined, and thus, an image without a joint can be displayed relatively easily. Note that, a slight aspherical component may be provided to the first optical surface 11f. A second optical surface 11s being a surface of the first optical member 11 on an incident side is divided into a first surface S1 corresponding to the emission lens part 11a and a second surface S2 corresponding to the emission lens part 11b. At a boundary between the first surface S1 and the second surface S2, a recess 11r having a V-shaped cross section is formed. The first surface S1 and the second surface S2 may be, for example, an aspherical surface or a free-form curved surface.

The intermediate lenses 12a and 13a and the incident lens 14a of the first optical system portion 10a may be any of a spherical surface lens, an aspherical surface lens, a free-form surface lens, and the like. Further, the number of the intermediate lenses 12a and 13a is not limited to two, and may be one or three or more. The intermediate lenses 12a and 13a may also be omitted. The intermediate lenses 12b and 13b and the incident lens 14b of the second optical system portion 10b may be any of a spherical surface lens, an aspherical surface lens, a free-form surface lens, and the like. Further, the number of the intermediate lenses 12b and 13b is not limited to two, and may be one or three or more. The intermediate lenses 12b and 13b may also be omitted.

On the light incident side of the pair of emission lens parts 11a and 11b, an aperture STP may be disposed. The aperture STP as described above can prevent formation of a ghost image caused by undesired light entering the position PE of the pupil EYa. Such aperture may be disposed in a periphery of the intermediate lenses 12a, 13a, 12b, and 13b, the incident lenses 14a, and 14b, and the like.

The first optical member 11 of a complex type including the pair of emission lenses part 11a and 11b may be formed by, for example, injection molding using plastic as a material, or may be formed by glass molding using a glass material. The intermediate lenses 12a and 13a and the incident lens 14a of the first optical system portion 10a may be formed of a plastic material or a glass material. Similarly, the intermediate lenses 12b and 13b and the incident lens 14b of the second optical system portion 10b may also be formed of a plastic material and a glass material.

The incident lens 14a of the first optical system portion 10a is disposed to face a display surface 21a of a display device or a display element for the upper side. The image light L1 from the display surface 21a sequentially passes through the incident lens 14a, the intermediate lenses 12a and 13a, and the emission lens part 11a to enter the position PE of the pupil EYa. Similarly, the incident lens 14b of the second optical system portion 10b is disposed to face a display surface 21b of a display device or a display element for the lower side. The image light L2 from the display surface 21b sequentially passes through the incident lens 14b, the intermediate lenses 12b and 13b, and the emission lens part 11b to enter the position PE of the pupil EYa. At this point, the image light L1 approaching the recess 11r and passing through the upper side at the joint part 11j and the image light L2 approaching the recess 11r and passing through the lower side at the joint part 11j enter the pupil EYa or the position PE of the pupil EYa in a periphery of the visual axis EX in substantially parallel to each other. Accordingly, jointing of the image light L1 and the image light L2 is achieved.

Figure 2A:
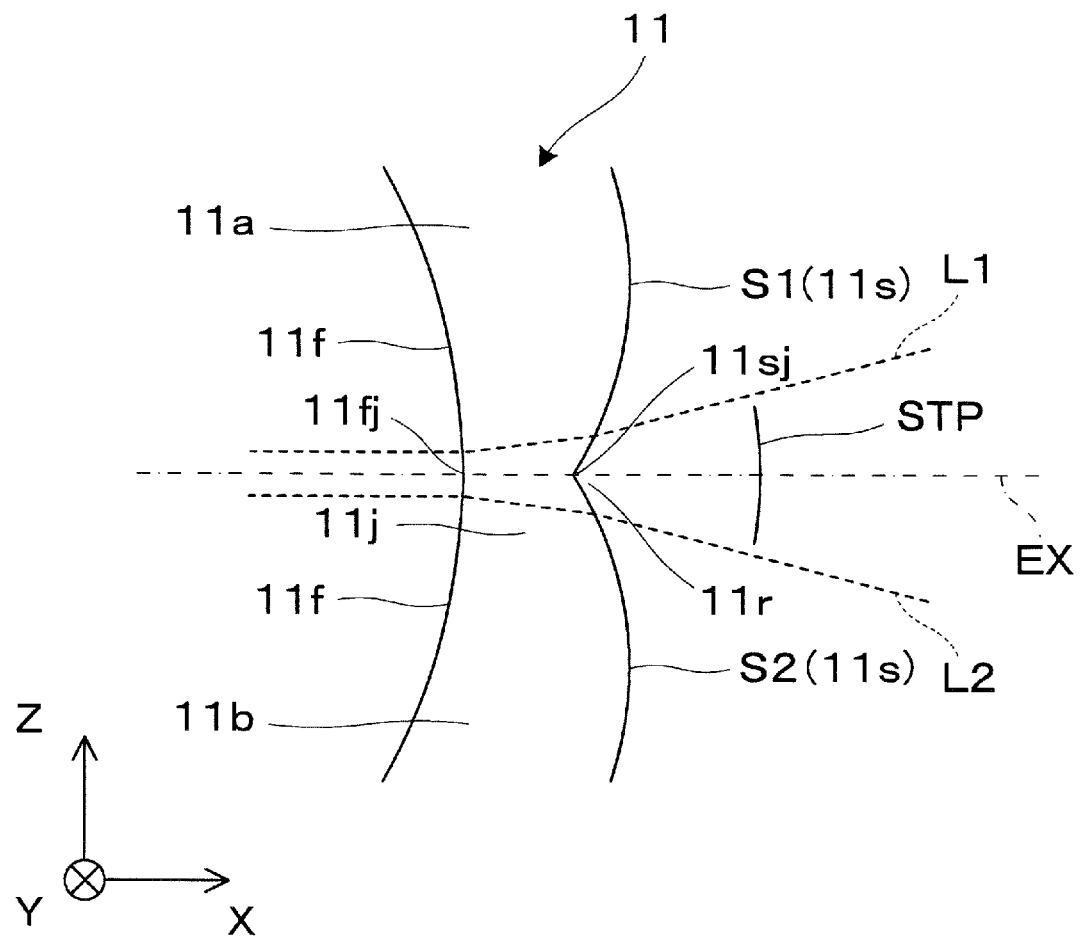
FIG. 2A is a partially enlarged view of the eyepiece optical system illustrated in FIG. 1.

As illustrated in FIG. 2A, in a cross section taken along the up-and-down direction of the first optical member 11 as one lens component or the Z direction, a curved line of the first optical surface 11f is continuous to a boundary 11fj between the upper side and the lower side across the visual axis EX, and is continuously changed in inclination. Meanwhile, in a cross section taken along the up-and-down direction of the first optical member 11 or the Z direction, a curved line of the second optical surface 11s is continuous to a boundary 11sj between the upper side and the lower side across the visual axis EX, but is non-continuously changed in inclination.

Figure 2B:
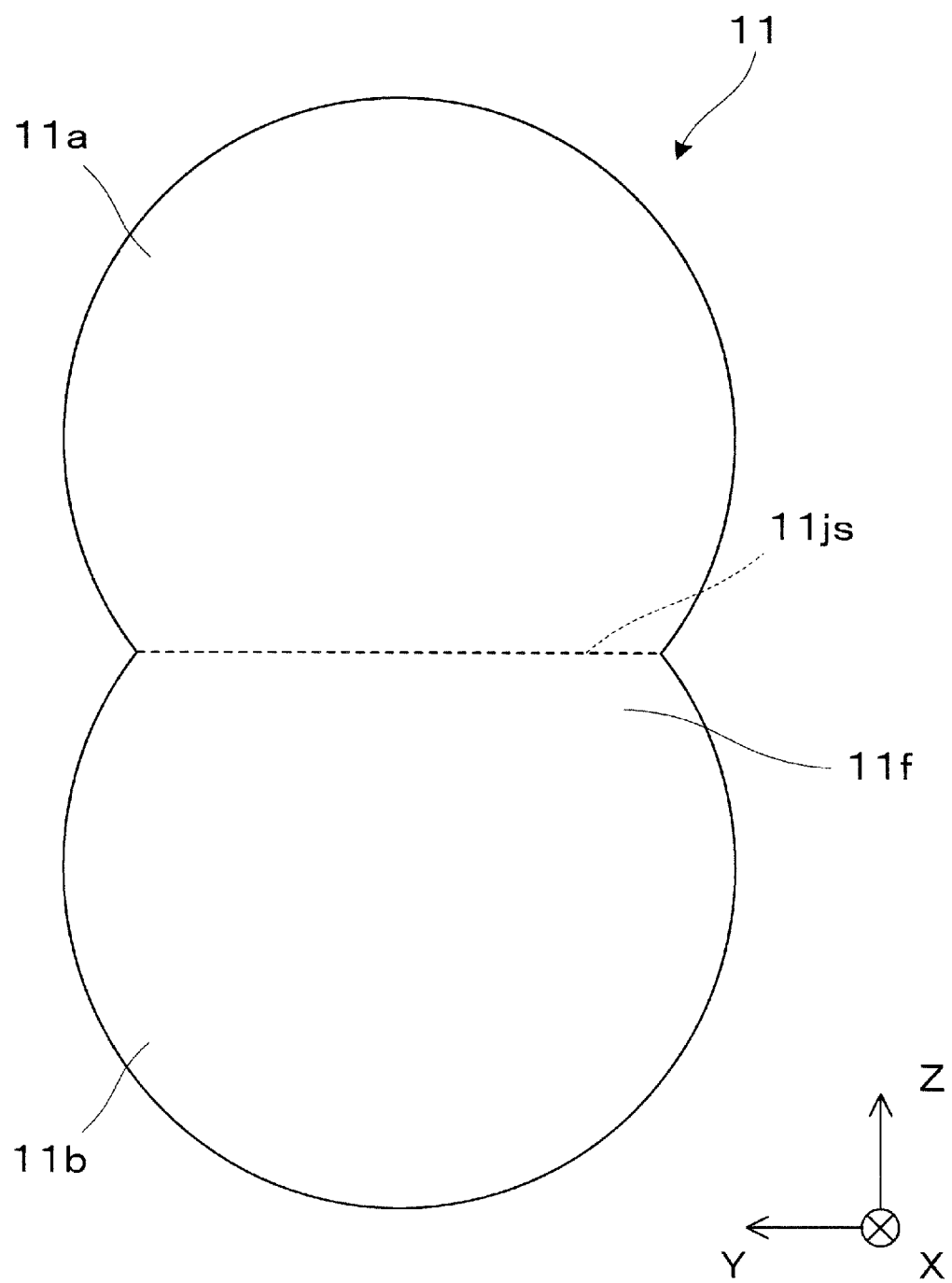
FIG. 2B is a view for illustrating an aspect of a first optical member viewed from an eye side.

FIG. 2B is a view for illustrating an aspect of the first optical member 11 viewed from the eye EY side. The boundary 11sj present behind the emission lenses parts 11a and 11b extends in the horizontal Y direction. Note that, a contour shape of the first optical member 11 is not limited to the shape illustrated in the drawings. That is, an optically effective area of the first optical member 11 is as illustrated in FIG. 2B, but the contour shape or outer shape of the first optical member 11 may extend outside the effective area, and may suitably be adjusted in accordance with a support frame of the lenses and arrangement of accessory components. An entire contour shape or outer shape may be an arbitrary shape such as a circle and a quadrangle. When the first optical member 11 includes an extension portion outside the optically effective area in the periphery of the first optical member 11 in this way, the first optical surface 11f is one curved surface expressed by one curvature in a portion inside the effective area, but may have any curvature in the extension portion outside the effective area. Thus, the first optical surface 11f may not be a curved surface expressed by one curvature. In view of this, it can be conceived that, even when a surface apparently extends outside from the first optical surface 11f, a surface in the extension portion outside the effective area is not substantially the first optical surface 11f. However, the extension portion outside the effective area may be regarded as a curved surface, which extends from the effective area and is expressed by one curvature.

Figure 3A:
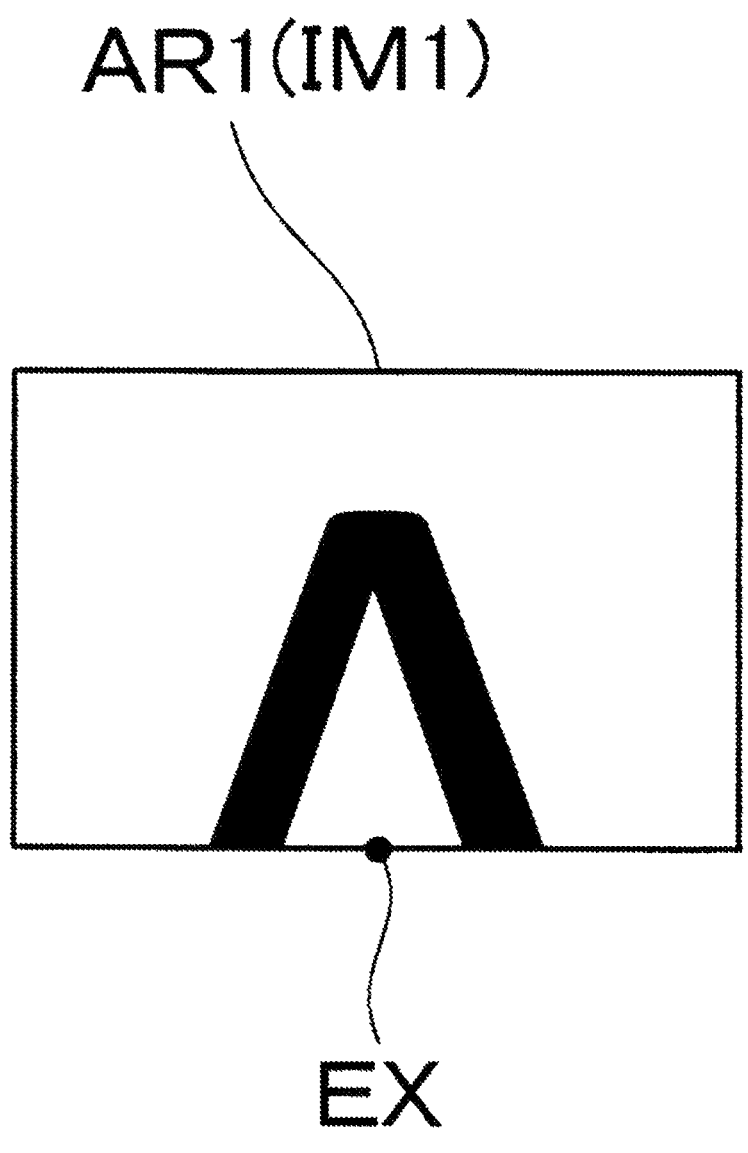
FIG. 3A is a view for illustrating a part of an image observed through the eyepiece optical system.
Figure 3B:
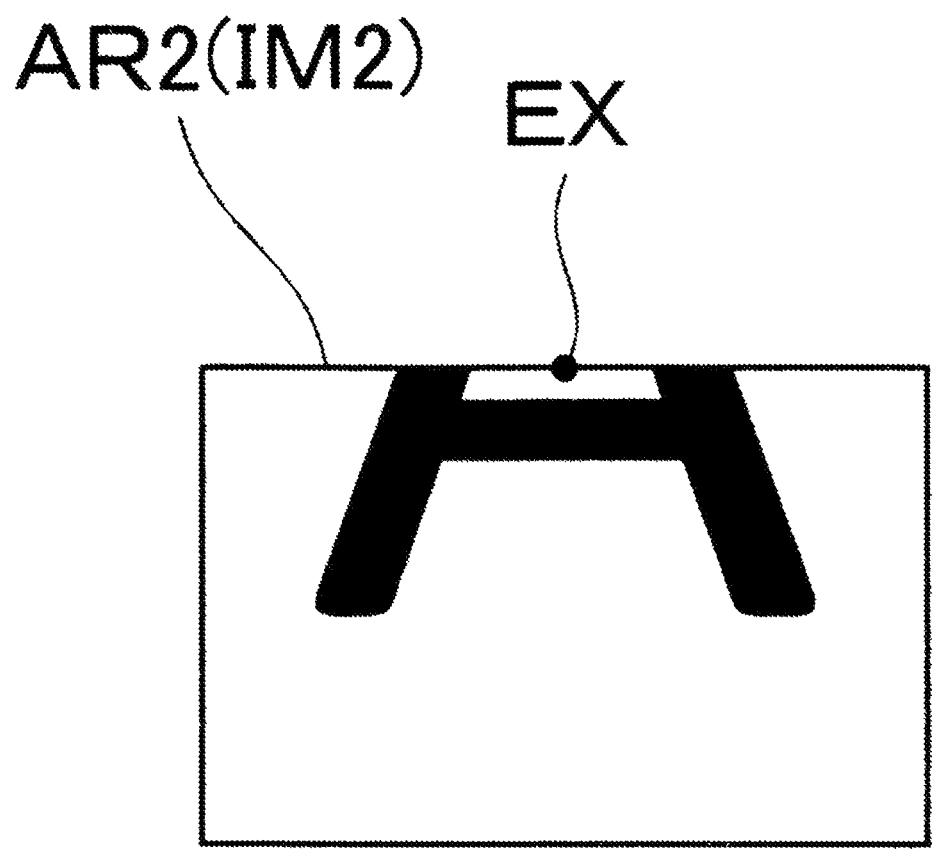
FIG. 3B is a view for illustrating a part of an image observed through the eyepiece optical system.
Figure 3C:
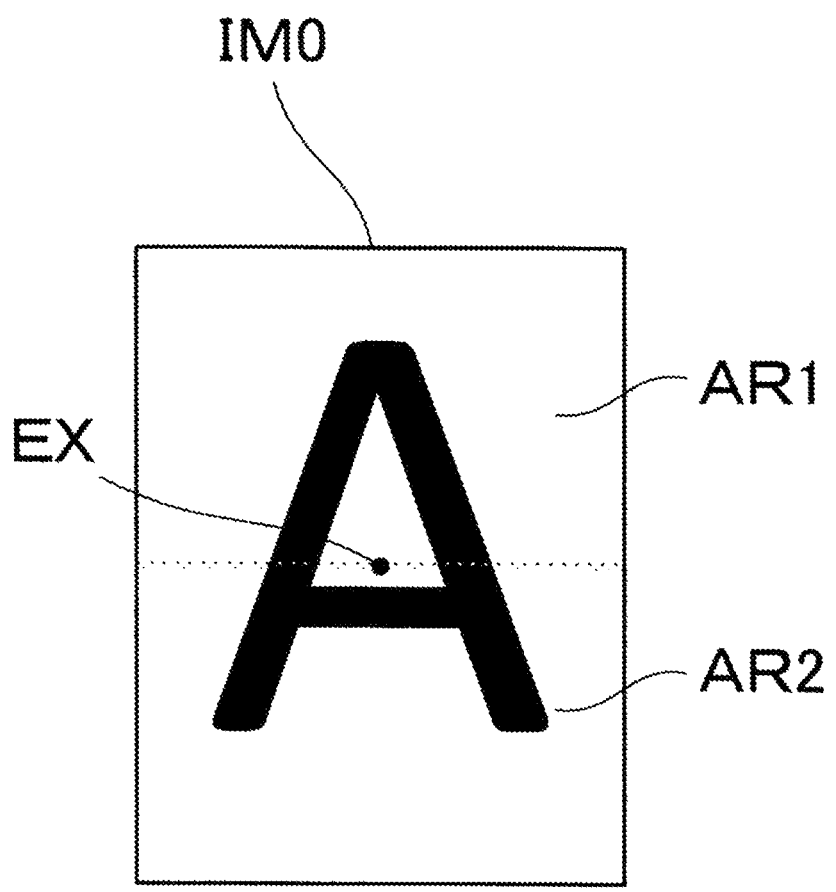
FIG. 3C is a view for illustrating an entire image observed through the eyepiece optical system.

FIG. 3A illustrates the area AR1 or a virtual image IM1 observed by the eye EY through the first optical system portion 10a, and corresponds to an image formed on the display surface 21a of the display element for the upper side. FIG. 3B illustrates the area AR2 or a virtual image IM2 observed by the eye EY through the second optical system portion 10b, and corresponds to an image formed on the display surface 21b of the display element for the lower side. FIG. 3C illustrates a virtual image IM0 observed by the eye EY through the eyepiece optical system 100 as a whole, and corresponds to a synthesized image of the image on the upper side illustrated in FIG. 3A and the image on the lower side illustrated in FIG. 3B. Note that, the first optical system portion 10a and the second optical system portion 10b may have distortion aberration, and the images formed on the display surfaces 21a and 21b may not be similar to the images illustrated in FIG. 3A and FIG. 3B.

Figure 4:
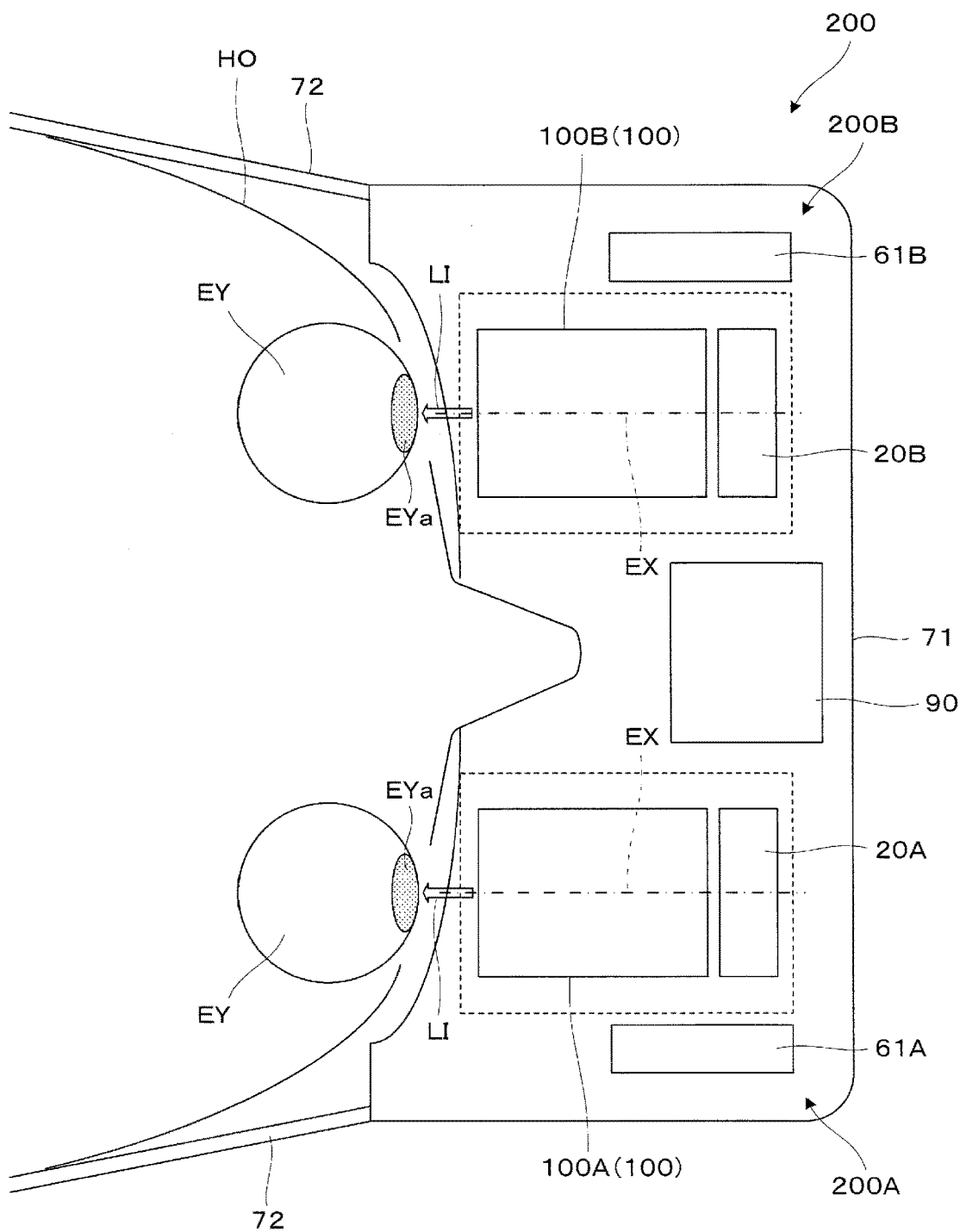
FIG. 4 is a schematic plan view for illustrating an image display device in which the eyepiece optical systems each illustrated in FIG. 1 are incorporated.

FIG. 4 is a plan view for illustrating an image display device in which the eyepiece optical systems 100 each illustrated in FIG. 1 are incorporated. An image display device 200 is a head mounted display of an eyeglasses type, and includes a pair of right and left image display units 200A and 200B and a controller 90 configured to control display operations of both the image display units 200A and 200B and the like. The image display device 200 causes synthesized light LI forming a virtual image to enter positions of both eyes EY of an observer HO being a wearer to allow the observer HO to recognize various images such as a moving image and a static image. Here, the synthesized light LI corresponds to an image obtained by joining, one above the other, the image light L1 formed by the first optical system portion 10a on the upper side and the image light L2 formed by the second optical system portion 10b on the lower side, which are illustrated in FIG. 1. Both the image display units 200A and 200B are supported in a case 71 being a common holder. The case 71 maintains a relative disposition relationship between the image display units 200A and 200B, and also maintains relative arrangement relation among the plurality of optical components forming each of the image display units 200A and 200B. The case 71 is removably fixed to a head of the observer HO with a band 72.

The image display unit 200A on the right side includes an eyepiece optical system 100A, a display section 20A, and a display drive circuit 61A. The image display unit 200B on the left side includes an eyepiece optical system 100B, a display section 20B, and a display drive circuit 61B.

In the image display unit 200A on the right side, the eyepiece optical system 100A is the same as the eyepiece optical system 100 illustrated in FIG. 1, and detailed description is omitted. The eyepiece optical system 100A includes the first optical system portion 10a and the second optical system portion 10b. On the emitting side of the eyepiece optical system 100A, the integrated first optical member 11 configured to synthesize optical paths is disposed.

The display section 20A is an image forming section configured to emit the image light L1 and the image light L2 to the eyepiece optical system 100A, and includes a first display element 2a disposed to face the incident lens 14a of the first optical system portion 10a and a second display element 2b disposed to face the incident lens 14b of the second optical system portion 10b (see FIG. 1). The first display element 2a and the second display element 2b perform the display operations by being driven by the display drive circuit 61A operated under the control of the controller 90. An image displayed on the first display element 2a is a divided part corresponding to an upper side of a unified entire image, and an image displayed on the second display element 2b is a divided part corresponding to a lower side of the unified entire image (see FIG. 3A to FIG. 3C).

The eyepiece optical system 100B, a display unit 20B, and a display drive circuit 61B that form the image display unit 200B on the left side have the same structures as the structures of the eyepiece optical system 100A, the display section 20A, and the display drive circuit 61A that form the image display unit 200A on the right side, and hence description is omitted. Note that, a virtual image formed by the image display unit 200B on the left side may not be the same as a virtual image formed by the image display unit 200A on the right side. For example, an image having a parallax component may be formed for each of the image display unit 200A and the image display unit 200B.

In the eyepiece optical system 100 (100A, 100B) according to First Exemplary Embodiment described above, the first optical surface 11f of the first optical member 11 on the emitting side, which is disposed at the position closest to the emitting side, is a curved surface expressed by one curvature. Thus, even when the image light L1 and the image light L2 are superimposed with each other or caused to approach each other to join the image light L1 and the image light L2 on the emitting side of the first optical member 11, light diffusion and also lack of a part of a video image hardly occur at the joint between the image light L1 and the image light L2.

In the above-mentioned example, the first optical system portion 10a and the second optical system portion 10b are arranged in the vertical direction. However, by switching the vertical direction and the horizontal direction, the first optical system portion 10a and the second optical system portion 10b may be arranged in the horizontal direction in which the eyes EY are arrayed.

Second Exemplary Embodiment

Now, an eyepiece optical system and the like according to Second Exemplary Embodiment are described. The eyepiece optical system according this exemplary embodiment is obtained by modifying the eyepiece optical system according to First Exemplary Embodiment, and description on common points with First Exemplary Embodiment is omitted.

Figure 5:
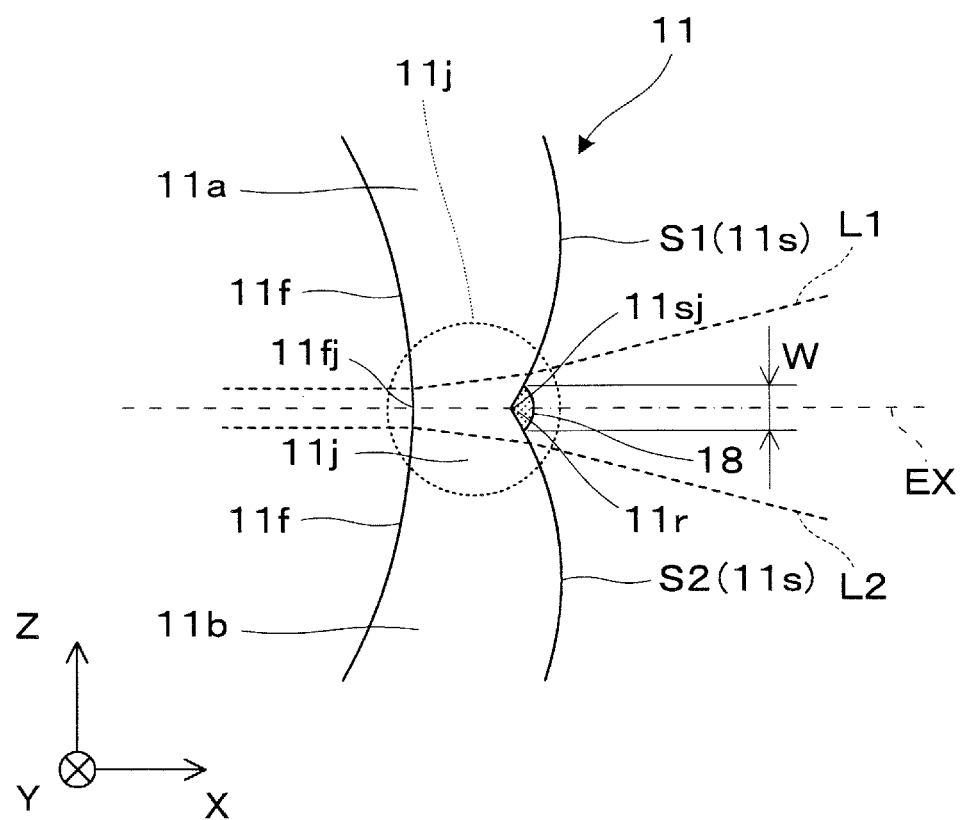
FIG. 5 is a side cross-sectional view for illustrating an eyepiece optical system according to Second Exemplary Embodiment.

FIG. 5 is an enlarged cross-sectional view for illustrating relevant parts of the eyepiece optical system according to Second Exemplary Embodiment, and corresponds to FIG. 2A. In the eyepiece optical system 100 according to Second Exemplary Embodiment, a light absorbing part 18 is provided on the second optical surface 11s opposite to the first optical surface 11f of the joint part 11j, which corresponds to the two areas AR1 and AR2 and is provided to the first optical member 11 of a complex type. When the image light L1, the image light L2, or unintended light enters the recess 11r of the joint part 11j, the light is diffused in an unintended direction on a surface having a large inclination angle in the periphery of the recess 11r. As a result, ghost light is generated, and contrast is degraded. In view of this, the light absorbing part 18 is mounted so as to fill the recess 11r. Accordingly, generation of the diffused light is prevented, and a video image displayed by the eyepiece optical system 100 can be improved in quality. Here, the light absorbing part 18 may be any component as long as the component has a light-absorbing property in a visible range and the like. For example, a sheet having a light-absorbing property, a light-absorbing coating material, and the like may be used. When using the sheet having a light-absorbing property as the light absorbing part 18, for example, the sheet may be fixed to the recess 11r through use of an adhesive member. Alternatively, when using the light-absorbing coating material, coloring may be performed with a black marking pen or a marker, or a light-absorbing coating material in a liquid state may be applied to a target part and then dried. The method of applying the light absorbing part 18 is not limited to the above-mentioned methods. For example, a louver film may be fixed to the recess 11r, or a material having a light absorbing material may fill the recess and be solidified.

A width W of the light absorbing part 18 in a direction orthogonal to the boundary 11sj is equal to or less than 30 μm. The width W may not be constant in the lateral Y direction, but may be changed along the Y direction.

In the illustrated example, the aperture STP is omitted. However, the aperture STP may be disposed at a suitable position while the light absorbing part 18 is provided.

In the eyepiece optical system 100 according to Second Exemplary Embodiment, the light absorbing part 18 is provided on the second optical surface 11s of the joint part 11j. Thus, with the recess 11r that is easily formed on the second optical surface 11s, the diffused light can be prevented from being generated, and image quality can be improved.

Third Exemplary Embodiment

Now, an eyepiece optical system and the like according to Third Exemplary Embodiment are described. The eyepiece optical system according this exemplary embodiment is obtained by modifying the eyepiece optical system according to First Exemplary Embodiment, and description on common points with First Exemplary Embodiment is omitted.

Figure 6:
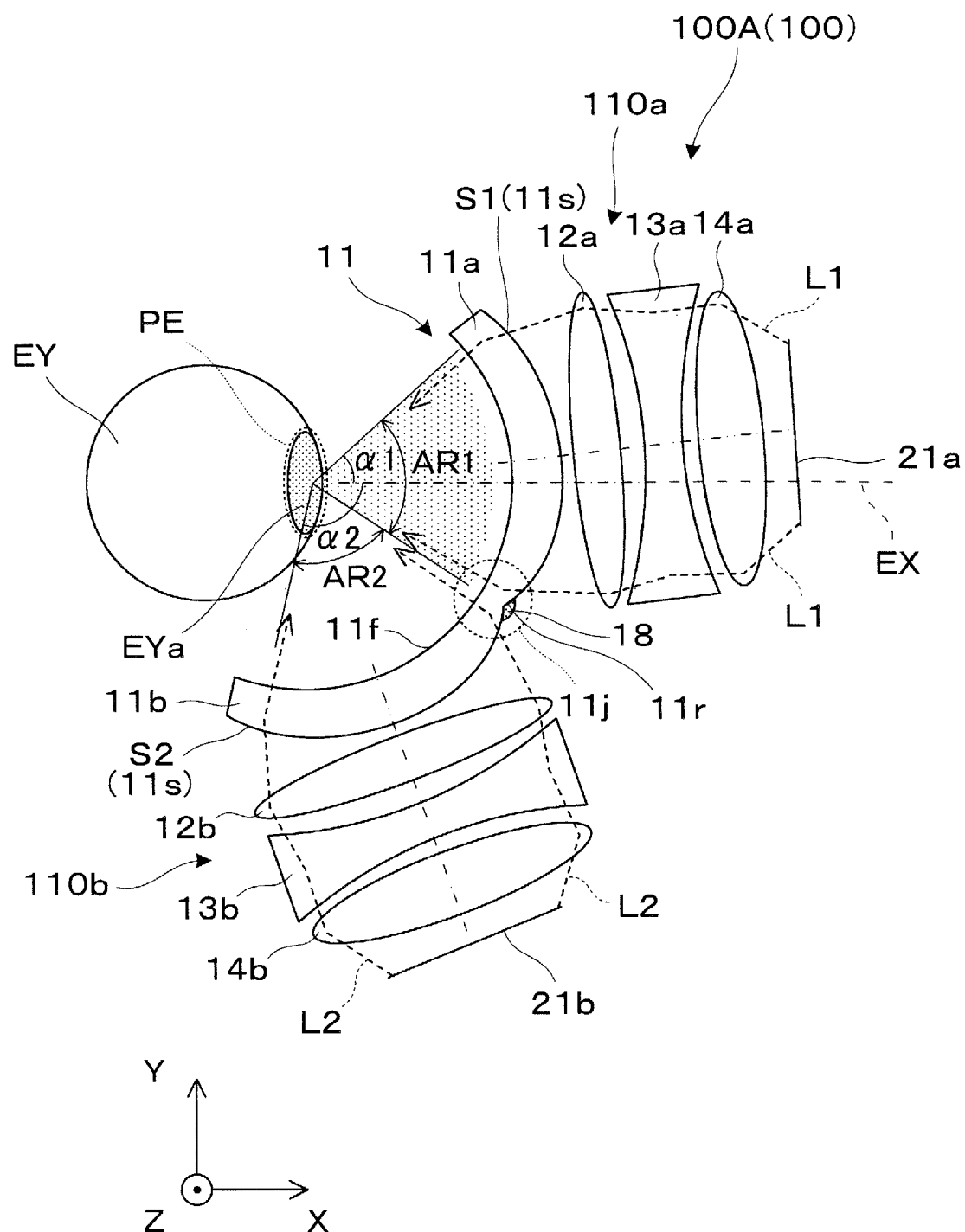
FIG. 6 is a plan cross-sectional view for illustrating an eyepiece optical system according to Third Exemplary Embodiment.

FIG. 6 is a plan cross-sectional view for illustrating the eyepiece optical system according to Third Exemplary Embodiment. The eyepiece optical system 100A for a right eye includes a first optical system portion 110a and a second optical system portion 110b. The first optical system portion 110a is disposed to cover a central visual field side in which the visual axis EX of the front-faced eye EY extends. The second optical system portion 110b is disposed to cover a peripheral visual field side outside of the central visual field in which the visual axis EX of the front-faced eye EY extends. Here, the first optical system portion 110a has a similar shape and structure to the shape and the structure of the first optical system portion 10a of the eyepiece optical system 100A according to First Exemplary Embodiment. However, the first optical system portion 110a forms a visual image projected to the first area AR1, which is on the front inner side (i.e., a side close to the other eye) of a visual image observed by the eyes EY of the observer HO. Meanwhile, the second optical system portion 110b has a similar shape and structure to the shape and the structure of the second optical system portion 10b of the eyepiece optical system 100A according to First Exemplary Embodiment. However, the second optical system portion 110b forms a visual image projected to the second area AR2, which is on the front side and the outer side (i.e., a side away from the other eye) of a visual image observed by the eyes EY of the observer HO. That is, the first optical system portion 110a is disposed to cover the first area AR1 on the center side in which the visual axis EX extends, and the second optical system portion 110b is disposed to cover the second area AR2 on the outer side away from the visual axis EX. The first optical member 11, which is common to the first optical system portion 110a and the second optical system portion 110b, is an optical element of a complex type corresponding to the two areas AR1 and AR2 being laterally divided.

In the eyepiece optical system 100A for the right eye illustrated in FIG. 6, the visual axis EX of the front-faced eye EY passes through a position close to a light axis of the first optical system portion 110a, and the joint part 11j is disposed at a position outside of the central visual field. Further, a visual angle α1 of the eyepiece optical system 100A for the right eye on the inner side may be set to be, for example, approximately 60° with respect to the visual axis EX as a reference. A visual field angle α2 of the eyepiece optical system 100A for the right eye on the outer side may be set to be, for example, approximately 100° with respect to the visual axis EX as a reference. In this way, through setting the field angle α1 on the inner side smaller than the field angle α2 on the outer side, designing of the first optical system portion 110a bearing a heavy load in terms of resolution is relatively facilitated.

Figure 7:
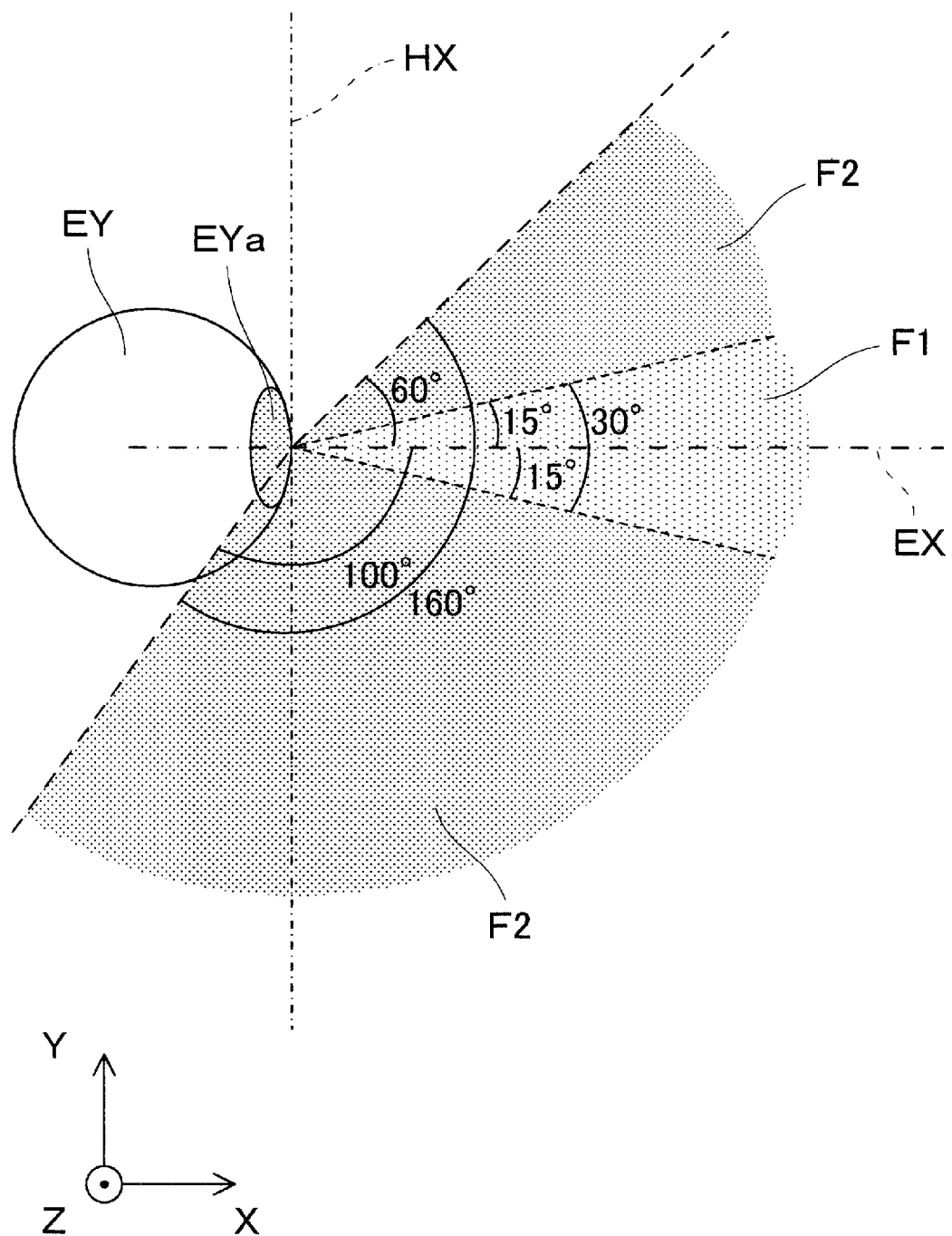
FIG. 7 is a view for illustrating a central visual field and a peripheral visual field with respect to a horizontal direction.

FIG. 7 is a view for illustrating the central visual field and the peripheral visual field of a person with respect to the horizontal direction. When a person gazes a target, the target within a range of several degrees is observed with high resolution, but a periphery of the range can be observed just with low resolution. Even when the eyes EY of the person turn or move in accordance with the target, the target becomes difficult to see. Thus, the person tries to maintain a front view by turning the head. In view of this, in a case where a central visual field F1 is assumed to have a range of approximately ±15° on right and left sides or on inner and outer sides with respect to the visual axis EX of the front-faced eye EY as a reference, and resolution is improved within the central visual field F1, it can be said that the eyepiece optical system 100A or the image display device 200 is practical. Further, for the right eye, when there is secured a peripheral field view F2, which is on the outer side of the central visual field F1 and has a range of approximately 60° on the inner side and a range of approximately 100° on the outer side with respect to the visual axis EX as a reference, it can be said that the eyepiece optical system 100A or the image display device 200 is practical. Note that, the peripheral visual field F2 as a whole is inclined outward with respect to a horizontal axis HX in which both the eyes are arrayed.

From such a viewpoint, the visual field angle α1 of the eyepiece optical system 100A for the right eye on the inner side is set to be approximately 60°, and the visual field angle α2 of the eyepiece optical system 100A for the right eye on the outer side is set to be approximately 100°. Here, the first optical system portion 110a on the inner side or the front side covers the central visual field F1, and an image projection with relatively high accuracy is performed with relatively high resolution. Further, the second optical system portion 110b on the outer side covers a part of the peripheral visual field F2, and image projection with relatively low resolution or relatively low accuracy is sufficient.

In this exemplary embodiment, on the second optical surface 11s opposite to the first optical surface 11f of the joint part 11j provided to the integrated first optical member 11 of a complex type, the light absorbing part 18 is provided at the position of the recess 11r. However, the light absorbing part 18 may be omitted.

Fourth Exemplary Embodiment

Now, an eyepiece optical system and the like according to Fourth Exemplary Embodiment are described. The eyepiece optical system according this exemplary embodiment is obtained by modifying the eyepiece optical system according to Third Exemplary Embodiment, and description on common points with Third Exemplary Embodiment is omitted.

Figure 8:
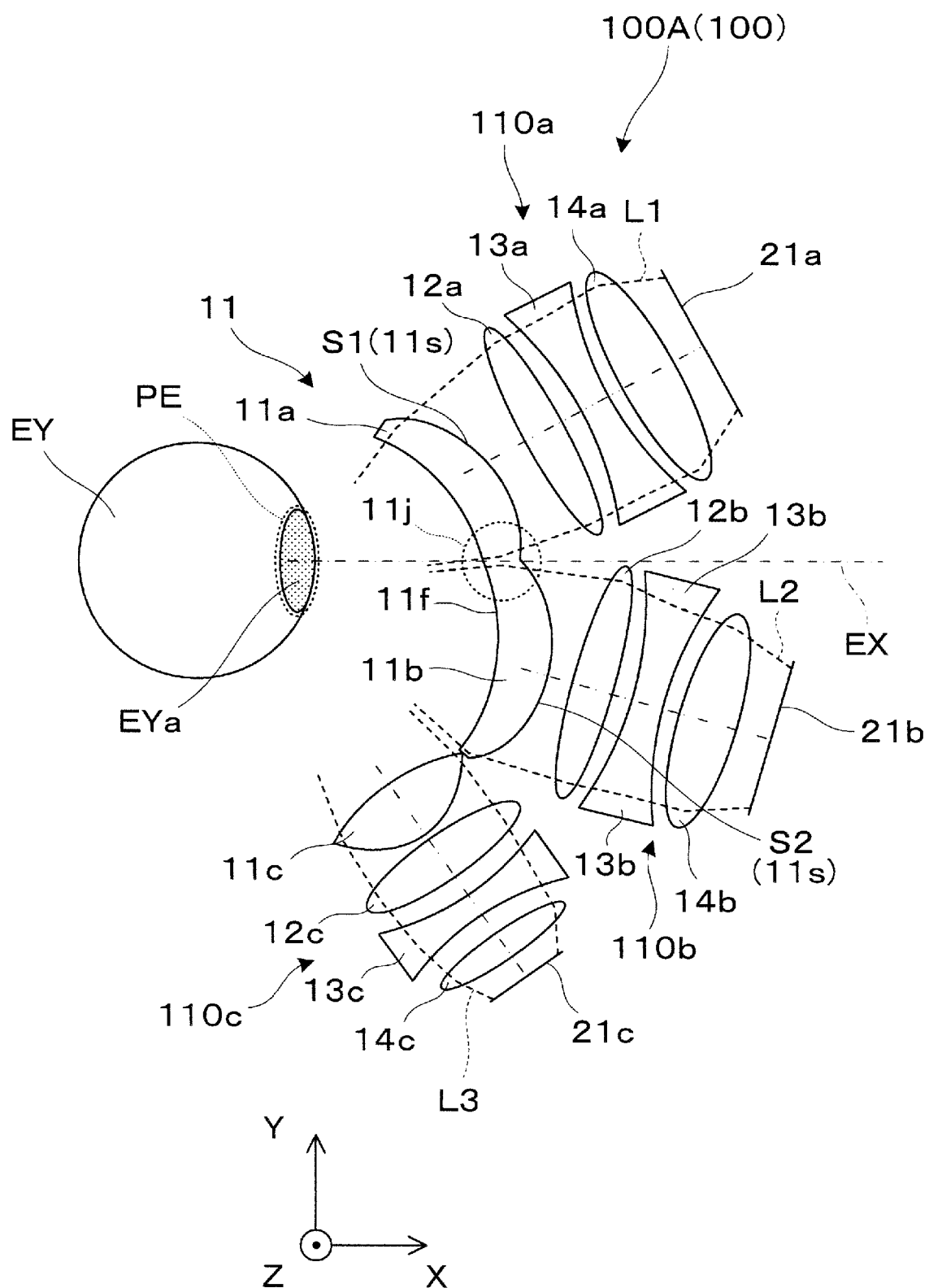
FIG. 8 is a plan cross-sectional view for illustrating an eyepiece optical system according to Fourth Exemplary Embodiment.

FIG. 8 is a plan cross-sectional view for illustrating the eyepiece optical system according to Fourth Exemplary Embodiment, and illustrates the eyepiece optical system for the right eye. The eyepiece optical system 100A for the right eye includes the first optical system portion 110a, the second optical system portion 110b, and a third optical system portion 110c. The first optical system portion 110a is disposed to cover the central visual field side in which the visual axis EX of the front-faced eye EY extends. The second optical system portion 110b is disposed to cover the central visual field in which the visual axis EX extends. The third optical system portion 110c is disposed to cover the peripheral visual field side other than the central visual field in which the visual axis EX extends. The third optical system portion 110c is an optical system separated from the second optical system portion 110b, and includes an emission lens part 11c, intermediate lenses 12c and 13c, and an incident lens 14c. Image light L3 from a display surface 21c of a display element sequentially passes through the incident lens 14c, the intermediate lenses 12c and 13c, and the emission lens part 11c, and enters the position PE of the pupil EYa.

In this case, the emission lens part 11a of the first optical system portion 10a and the emission lens part 11b of the second optical system portion 10b are integrated to form the first optical member 11 of a complex type. However, the emission lens part 11c of the third optical system portion 110c is provided adjacent to the first optical member 11 but separated from the first optical member 11. The emission lens part 11c is independent from the first optical member 11.

In the eyepiece optical system 100A for the right eye illustrated in FIG. 8, the visual axis EX of the front-faced eye EY extends in a vicinity of a boundary between the first optical system portion 110a and the second optical system portion 110b. As a result, the first optical system portion 110a and the second optical system portion 110b cover the central visual field F1, and image projection with relatively high accuracy is performed. Further, the third optical system portion 110c on the outer side covers a part of the peripheral visual field F2, and image projection with relatively low accuracy is performed. Between the first optical system portion 110a and the second optical system portion 110b, with the first optical surface 11f common to the emission lens part 11a and the emission lens part 11b, light is not likely to be diffused at the joint between the image light L1 and the image light L2. Meanwhile, the image light L3 from the third optical system portion 110c is diffused or lacks part of the image light L3 at the joint in the boundary with the second optical system portion 110b. However, the diffusion and the lack are caused in the peripheral visual field F2, and are not critical as degradation of image quality. Here, the first optical system portion 110a and the second optical system portion 110b have a configuration in which the visual field is divided into two fields, that is, the central visual field F1 and the peripheral visual field F2 on the inner side. When the first optical system portion 110a and the second optical system portion 110b are configured to have a symmetrical shape, the first optical system portion 10a and the second optical system portion 10b may be the same optical system. Thus, it is effective in cost reduction in manufacturing.

Note that, the light absorbing part 18 may be provided at the position of the recess 11r on the second optical surface 11s of the joint part 11j between the first optical system portion 110a and the second optical system portion 110b. Further, although omitted in illustration, the emission lens part 11c may be integrated with the first optical member 11 to form the first optical member of a complex type covering the three areas.

Fifth Exemplary Embodiment

Now, an eyepiece optical system and the like according to Fifth Exemplary Embodiment are described. The eyepiece optical system according to this exemplary embodiment is obtained by modifying the eyepiece optical system according to First Exemplary Embodiment, and description on common points with First Exemplary Embodiment is omitted. Note that, as opposed to First to Fourth Exemplary Embodiments relating to the optical system of a lateral division type, Fifth Exemplary Embodiment relates to an optical system of a lateral division type.

Figure 9:
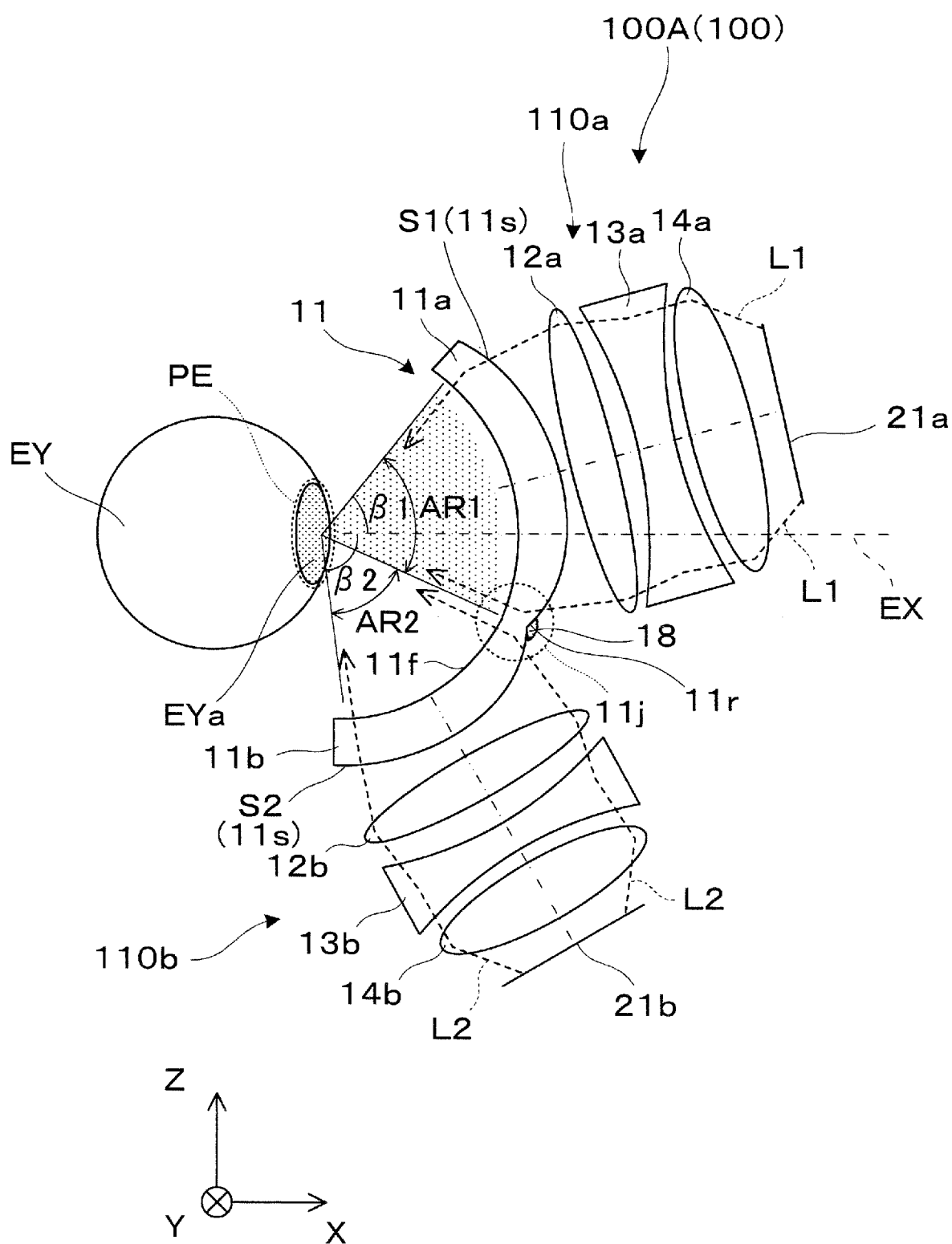
FIG. 9 is a side cross-sectional view for illustrating an eyepiece optical system according to Fifth Exemplary Embodiment.

FIG. 9 is a side cross-sectional view for illustrating the eyepiece optical system according to Fifth Exemplary Embodiment. In FIG. 9, the up-and-down direction of the drawing sheet is the vertical Z direction. The eyepiece optical system 100A for the right eye includes the first optical system portion 110a and the second optical system portion 110b. The first optical system portion 110a is disposed to cover the central visual field side in which the visual axis EX of the front-faced eye EY extends. The second optical system portion 110b is disposed to cover the peripheral visual field side outside of the central visual field side in which the visual axis EX of the front-faced eye EY extends. Here, the first optical system portion 110a has a similar shape and structure to the shape and the structure of the first optical system portion 10a of the eyepiece optical system 100A according to First Exemplary Embodiment. However, the first optical system portion 110a forms a visual image projected to the first area AR1, which is on the front side or the front upper side of a visual image observed by the eye EY of the observer HO. Meanwhile, the second optical system portion 110b has a similar shape and structure to the shape and the structure of the second optical system portion 10b of the eyepiece optical system 100A according to First Exemplary Embodiment. However, the second optical system portion 110b forms a visual image projected to the second area AR2, which is on the front lower side of the visual image observed by the eye EY of the observer HO. That is, the first optical system portion 110a is disposed to cover the first area AR1 on the center side in which the visual axis EX extends, and the second optical system portion 110b is disposed to cover the second area AR2 on the outer side away from the visual axis EX.

In the eyepiece optical system 100A for the right eye illustrated in FIG. 9, the visual axis EX of the front-faced eye EY passes through a position close to a light axis of the first optical system portion 110a, and the joint part 11j is disposed at a position shifted from the central visual field. Further, a visual angle β1 of the eyepiece optical system 100A for the right eye on the upper side may be set to be, for example, approximately 60° with respect to the visual axis EX as a reference. A visual field angle β2 of the eyepiece optical system 100A for the right eye on the lower side may be set to be, for example, approximately 80° with respect to the visual axis EX as a reference. As described above, by setting the field angle β1 on the upper side smaller than the field angle β2 on the lower side, designing of the first optical system portion 110a bearing a heavy load in terms of resolution is relatively facilitated.

Figure 10:
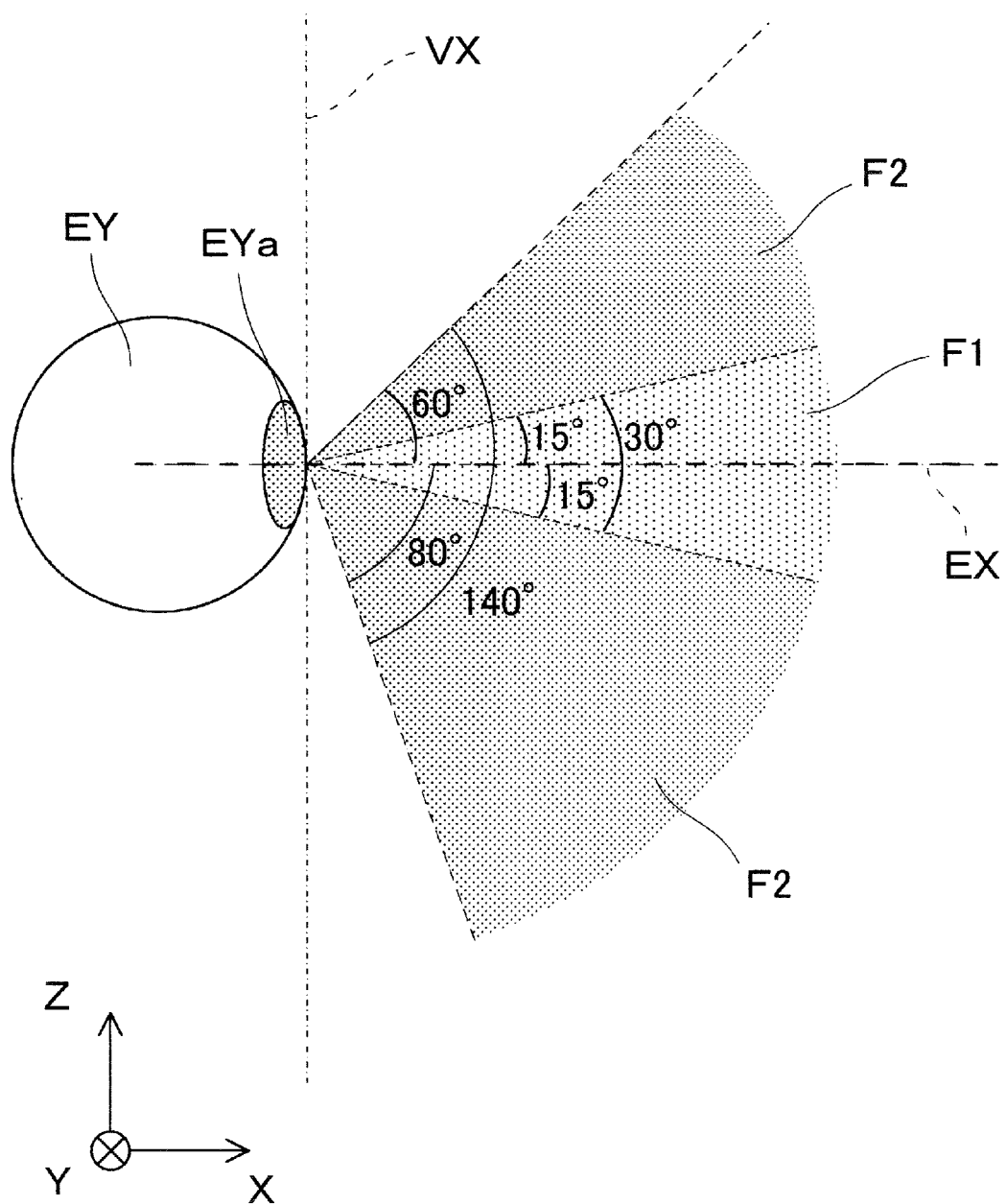
FIG. 10 is a view for illustrating a central visual field and a peripheral visual field with respect to a vertical direction.

FIG. 10 is a view for illustrating the central visual field and the peripheral visual field of a person with respect to the vertical direction. The central visual field F1 is assumed to have a range of approximately ±15° on upper and lower sides with respect to the visual axis EX of the front-faced eye EY as a reference. When resolution is improved within the central visual field F1, it can be said that the eyepiece optical system 100A or the image display device 200 is practical. Further, when there is secured the peripheral field view F2, which is on the outer side of the central visual field F1 and has a range of approximately 60° on the upper side and a range of approximately 80° on the lower side with respect to the visual axis EX as a reference, it can be said that the eyepiece optical system 100A or the image display device 200 is practical. Note that, the peripheral visual field F2 as a whole is inclined downward with respect to a vertical axis VX.

From such a viewpoint, the visual field angle β1 of the eyepiece optical system 100A for the right eye on the upper side is set to be approximately 60°, and the visual field angle β2 of the eyepiece optical system 100A for the right eye on the lower side is set to be approximately 80°. Here, the first optical system portion 110a on the upper side or the front side covers the central visual field F1, and an image projection with relatively high accuracy is performed with relatively high resolution. Further, the second optical system portion 110b on the lower side covers a part of the peripheral visual field F2, and image projection with relatively low resolution or relatively low accuracy is sufficient.

Other Modified Examples and the Like

The invention is described according to the above-mentioned exemplary embodiments, but the invention is not limited to the above-mentioned exemplary embodiments.

The invention may be carried out in various modes without departing from the gist of the invention, and, for example, the following modifications may be carried out.

While the first optical system portion 10a and the second optical system portion 10b are assembled to each other in the longitudinal direction or the vertical direction, the first optical system portion 110a and the second optical system portion 110b may be assembled to each other in the lateral direction or the horizontal direction.

Four or more of the optical system portions 10a, 10b, 110a, and 110b may be arrayed in the vertical direction or the horizontal direction.

In the above-mentioned description, the image display device 200 includes the pair of image display units 200A and 200B to correspond to both the right eye and the left eye. However, there may be employed a configuration in which the image display device is provided for one of the right eye and the left eye to view an image with one eye.

In the above-mentioned description, the eyepiece optical system 100 forms an image display device of an eyeglasses type or a head mounted display. However, the eyepiece optical system 100 may form a device of other types such as an image display device of a goggles type and a hand-held display.

In the above-mentioned description, the display elements 2a and 2b face the incident lenses 14a and 14b of the optical system portions 10a and 10b, respectively. However, planar mirrors and the like may be disposed between the incident lenses 14a and 14b and the display elements 2a and 2b to bend optical paths. In this case, the degree of freedom in disposition of the display elements 2a and 2b can be enhanced.

In the above-mentioned description, a case is described in which the first optical system portions 10a and 110a and the second optical system portions 10b and 110b are arranged in the longitudinal Z direction or the lateral Y direction. However, the first optical system portion and the second optical system portion may be arranged in an oblique direction between the Z direction and the Y direction. Note that, when 3×3 of the optical system portions are arrayed in the Z direction and the Y direction, a center optical system portion and an upper right optical system portion are arrayed in the oblique direction. Note that, when 3×3 of the optical system portions are arrayed, the center optical system portion may have a contour formed into an octagonal shape and the like in place of a quadrangular shape to provide boundaries extending obliquely.

The entire disclosure of Japanese Patent Application No. 2017-201614, filed Oct. 18, 2017 is expressly incorporated by reference herein.

What is claimed is:

1. An eyepiece optical system configured to emit an image light that is emitted from a plurality of display elements and that corresponds to a plurality of divided areas, to a position corresponding to an eye of an observer, comprising:
   an incident lens that is disposed where image light that enters the incident lens corresponds to one of the plurality of divided areas; and
   a first optical member of a complex type that is disposed at a position closest to an emitting side among a plurality of lens and corresponds to at least two areas of the plurality of areas, wherein
   the first optical member has a first optical surface on the emitting side,
   the first optical surface is expressed by one curvature,
   a first optical system portion disposed to cover a first area on a center side in which a visual axis extends frontward;
   a second optical system portion disposed to cover a second area which is away from the visual axis, and is on an outer side of the first area covered by the first optical system portion; and
   a joint part is provided between the first optical system portion and the second optical system portion,
   the joint part comprises a light absorbing part, and
   the light absorbing part is provided on a second optical surface opposite to the first optical surface.

2. The eyepiece optical system according to claim 1, wherein
   the first optical surface is set to have a curvature corresponding to an eye relief.

3. The eyepiece optical system according to claim 2 comprising:
   a first optical system portion disposed to cover a first area on a center side in which a visual axis extends frontward;
   a second optical system portion disposed to cover a second area which is away from the visual axis, and is on an outer side of the first area covered by the first optical system portion; and
   a joint part that is provided between the first optical system portion and the second optical system portion.

4. The eyepiece optical system according to claim 3, wherein
   the joint part is a part integrally coupling an emission lens part of the first optical portion and an emission lens part of the second optical system portion to each other.

5. The eyepiece optical system according to claim 3, wherein
   the first optical system portion on the center side has resolution higher than resolution of the second optical system portion on a peripheral side.

6. The eyepiece optical system according to claim 3, wherein
   the first optical system portion on the center side has a field angle smaller than a field angle of the second optical system portion on the peripheral side.

7. The eyepiece optical system according to claim 1, wherein
   the light absorbing part has a width of 30 μm or less in a direction orthogonal to a boundary.

8. An image display device comprising:
   the eyepiece optical system according to claim 1;
   a plurality of display elements configured to emit image light to the eyepiece optical system; and
   a controller configured to control display operations of the plurality of display elements.

9. An image display device comprising:
   a first display element that emits a first image light;
   a second display element that emits a second image light;
   a first incident lens that receives the first image light from the first display element and emits the first image light;
   a second incident lens that receives the second image light from the second display element and emits the second image light; and
   a first optical member that includes a first emission lens portion that emits the first image light, a second emission lens portion that emits the second image light, and a joint part that is provided between the first emission lens portion and the second emission lens portion, wherein the first incident lens and the first emission lens portion are separate from each other, the first emission lens portion includes a first incident surface that receives the first image light from the first incident lens and a first emission surface that emits the first image light, the second incident lens and the second emission lens portion are separate from each other, the second emission lens portion includes a second incident surface that receives the second image light from the second incident lens and a second emission surface that emits the second image light, the first optical member includes a first optical surface that includes the first emission surface and the second emission surface, the first optical surface is expressed by one curvature, the joint part comprises a light absorbing part, and the light absorbing part is provided on a second optical surface opposite to the first optical surface.

* * * * *